US008837768B2

(12) United States Patent
Subat et al.

(10) Patent No.: US 8,837,768 B2
(45) Date of Patent: Sep. 16, 2014

(54) ELECTRO-ACOUSTIC TRANSDUCER ENCLOSURE

(75) Inventors: Brad Subat, Northborough, MA (US); Daniel Hodgkins, Princeton, MA (US); David Meeker, Acton, MA (US); Daniel J. Sheehan, Holliston, MA (US); Martin A. Weber, Esslingen (DE)

(73) Assignee: Bose Corporation, Framingham, MA (US)

( * ) Notice: Subject to any disclaimer, the term of this patent is extended or adjusted under 35 U.S.C. 154(b) by 483 days.

(21) Appl. No.: 13/072,837

(22) Filed: Mar. 28, 2011

(65) Prior Publication Data

US 2012/0250929 A1 Oct. 4, 2012

(51) Int. Cl.
| | | |
|---|---|---|
| *H04R 1/02* | (2006.01) | |
| *H04R 1/28* | (2006.01) | |
| *H04B 1/00* | (2006.01) | |
| *H04R 9/06* | (2006.01) | |
| *H04R 1/20* | (2006.01) | |
| *B60R 11/00* | (2006.01) | |

(52) U.S. Cl.
CPC ............ *H04R 1/2803* (2013.01); *H04R 1/2819* (2013.01); *B60R 2011/0021* (2013.01)
USPC ............... 381/389; 381/86; 381/87; 381/322; 381/345; 381/386

(58) Field of Classification Search
USPC ............. 381/86, 87, 124, 150, 189, 332–336, 381/337–338, 345–346, 348–349, 352–354, 381/386, 389, 392, 395, 433; 181/189, 194, 181/196, 199
See application file for complete search history.

(56) References Cited

U.S. PATENT DOCUMENTS

| | | | |
|---|---|---|---|
| 5,138,656 A | 8/1992 | Shanes | |
| 2004/0062414 A1 | 4/2004 | Kobayashi | |
| 2008/0101646 A1* | 5/2008 | Holmi | 381/389 |
| 2009/0200102 A1 | 8/2009 | Gilbert | |
| 2009/0310812 A1* | 12/2009 | Close | 381/389 |

FOREIGN PATENT DOCUMENTS

| | | |
|---|---|---|
| DE | 19717908 A1 | 10/1998 |
| DE | 10132192 A1 | 1/2003 |
| EP | 0 129 320 | 12/1984 |
| GB | 2 378 844 A | 2/2003 |
| GB | 2378844 A * | 2/2003 |
| JP | 63290495 A | 11/1988 |
| JP | H02103989 U | 8/1990 |
| JP | 4058697 A | 2/1992 |
| JP | H04-003787 | 8/1993 |
| JP | 2005-045783 A | 2/2005 |

OTHER PUBLICATIONS

International Search Report and Written Opinion of the International Searching Authority mailed Mar. 6, 2012 in corresponding PCT Application No. PCT/US2012/027806.

(Continued)

*Primary Examiner* — Matthew Eason
(74) *Attorney, Agent, or Firm* — Brian M. Dingman; Dingman, McInnes & McLane, LLP

(57) ABSTRACT

An apparatus that has an electro-acoustic transducer, a frame supporting the transducer, and an enclosure made from two enclosure members that are each coupled to the frame. At least one of the enclosure members is made partially or entirely of foam.

27 Claims, 13 Drawing Sheets

(56) References Cited

OTHER PUBLICATIONS

International Preliminary Report on Patentability issued in corresponding application No. PCT/US2012/027806 mailed on Oct. 10, 2013.

Office Action issued on Jul. 7, 2014 in corresponding EP Application No. 12 713 817.0.

Office Action issued on Jul. 15, 2014 in corresponding JP Application No. 2014-502590 (with English Translation).

* cited by examiner

ELECTRO-ACOUSTIC TRANSDUCER ENCLOSURE

FIELD

This disclosure relates to electro-acoustic transducer enclosures.

BACKGROUND

Electro-acoustic transducers are sometimes mounted in enclosures. The enclosure design and volume have a substantial effect on the quality of the transducer output. In certain circumstances, there are space and shape constraints imposed by the environment in which the transducer is located that need to be addressed for a successful enclosure design and thus transducer operation. One example is the mounting of a transducer in the door panel of a vehicle. The transducer must be protected from moisture and thus must be sealed to the door panel. Also, the volume that can be devoted to the transducer and its enclosure, and the shape and configuration of such volume, may be severely constrained by other vehicle design considerations. Further, there is a drive to reduce vehicle weight and thus the weight of the transducer enclosure is an important consideration of a successful design for automotive use.

SUMMARY

In general, one aspect of the disclosure features an apparatus comprising an electro-acoustic transducer, a frame supporting the transducer, and an enclosure comprising first and second enclosure members each coupled to the frame, at least one of the enclosure members comprising foam.

Various implementations of the disclosure may include one or more of the following features. The first and second enclosure members may comprise foam. The first and second enclosure members may be made entirely of foam. The enclosure may be made entirely of the first and second enclosure members. The enclosure members may each be directly coupled to the frame. The apparatus may further comprise an acoustic element that acoustically couples an enclosure volume to a listening area. The acoustic element may comprise a port. The port may be formed at least in part by an enclosure member. The port may comprise a tube defining a first length, the tube further defining a first open end inside the enclosure and a second open end that is open to the listening area. The tube may comprise a first partial tube wall formed in the frame and a second partial tube wall formed in an enclosure member, the first and second partial tube walls each defining the first length and coupled together along their lengths to form the tube.

Various additional implementations of the disclosure may include one or more of the following features. The frame may comprise a transducer mounting flange to which the transducer is mounted. The frame may define an enclosure member mounting structure to which the first and second enclosure members are directly coupled. The enclosure member mounting structure may be characterized by a frame plane. The transducer may comprise a front radiating surface that moves along a transducer axis, in which case the transducer axis may be generally parallel to the frame plane. The transducer axis may be parallel to or coincident with the frame plane. The frame may further comprise a diverter that extends in front of the front radiating surface of the transducer. The diverter may comprise a scoop that is located primarily or entirely on one side of the frame plane.

Various additional implementations of the disclosure may include one or more of the following features. The frame may be made of plastic. The apparatus may further comprise a baffle, wherein the frame is coupled to the baffle. The baffle may be selected from a group consisting of a vehicle door panel, a vehicle rear package shelf, a vehicle instrument panel, a room wall and a room ceiling. The transducer may comprise a front radiating surface that moves along a transducer axis, and the transducer axis may be generally parallel to or coincident with the baffle.

Various additional implementations of the disclosure may include one or more of the following features. The first enclosure member may be made entirely of foam. The second enclosure member may comprise vehicle trim. The apparatus may be adapted to be mounted to a vehicle door panel. The frame may be mounted to the vehicle door panel, and the first and second enclosure members may be mounted to the frame. The apparatus may be adapted to be mounted to a vehicle door panel and vehicle trim. The vehicle door panel and vehicle trim may be spaced from one another and the apparatus may be located in this space. The apparatus may further comprise mounting structures located between the apparatus and the vehicle door panel and the vehicle trim. The mounting structures may comprise one or more first foam blocks located between the first enclosure member and the vehicle door panel and one or more second foam blocks located between the second enclosure member and the vehicle trim.

In general, another aspect of the disclosure features a speaker enclosure comprising an electro-acoustic transducer comprising a front radiating surface that moves along a transducer axis, a plastic frame supporting the transducer, wherein the frame comprises a transducer mounting flange to which the transducer is mounted, an enclosure made entirely of first and second enclosure members each directly coupled to the frame, the enclosure members made entirely of foam, and a port that acoustically couples an enclosure volume to a listening area. The frame may define an enclosure member mounting structure to which the first and second enclosure members are directly coupled, the enclosure member mounting structure may be characterized by a frame plane, and the transducer axis may be generally parallel to or coincident with the frame plane.

In general, another aspect of the disclosure features a speaker enclosure adapted to be mounted to a vehicle door panel, comprising an electro-acoustic transducer comprising a front radiating surface that moves along a transducer axis, a plastic frame supporting the transducer and adapted to be mounted to the vehicle door panel, wherein the frame comprises a transducer mounting flange to which the transducer is mounted, an enclosure made entirely of first and second enclosure members each directly coupled to the frame, the enclosure members made entirely of foam, and a port that acoustically couples an enclosure volume to the interior of the vehicle. The frame may define an enclosure member mounting structure to which the first and second enclosure members are directly coupled, the enclosure member mounting structure may be characterized by a frame plane, and the transducer axis may be generally parallel to or coincident with the frame plane and the vehicle door panel.

DETAILED DESCRIPTION

Figure 1:
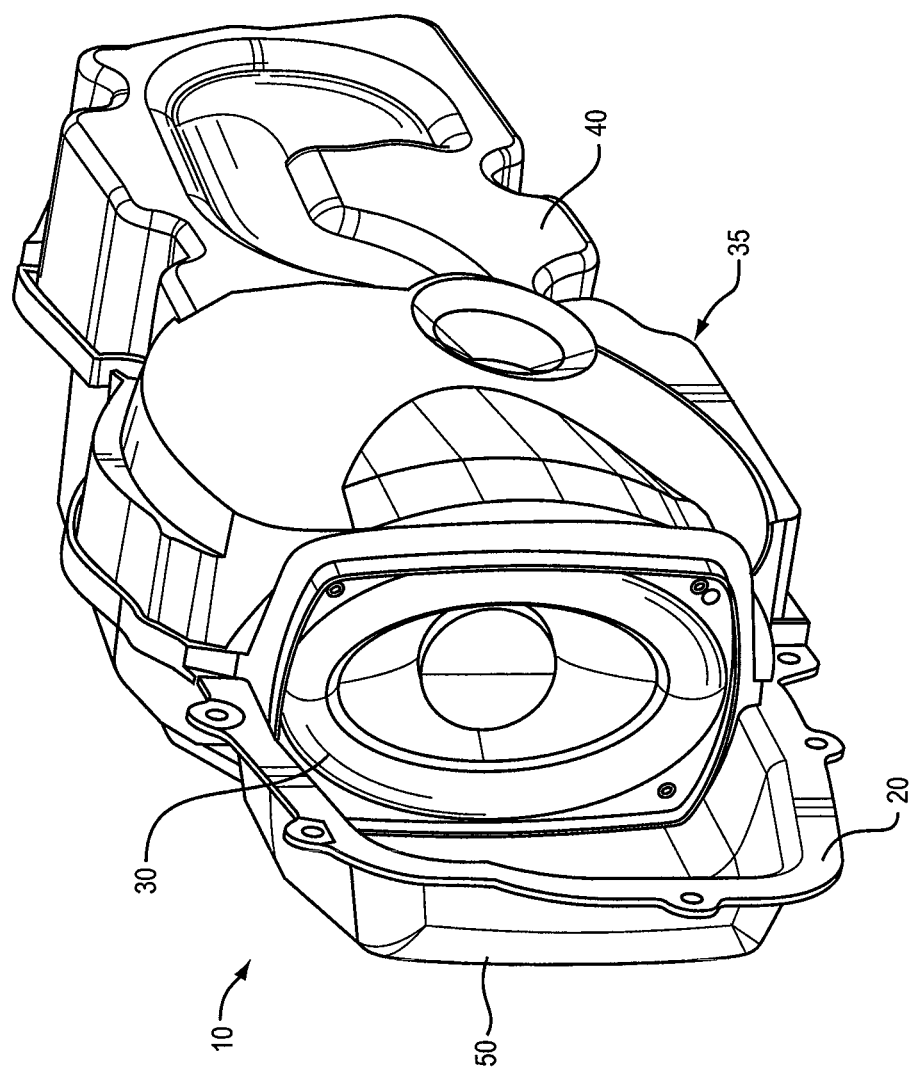
FIG. 1 is a perspective view of an electro-acoustic enclosure apparatus.
Figure 2:
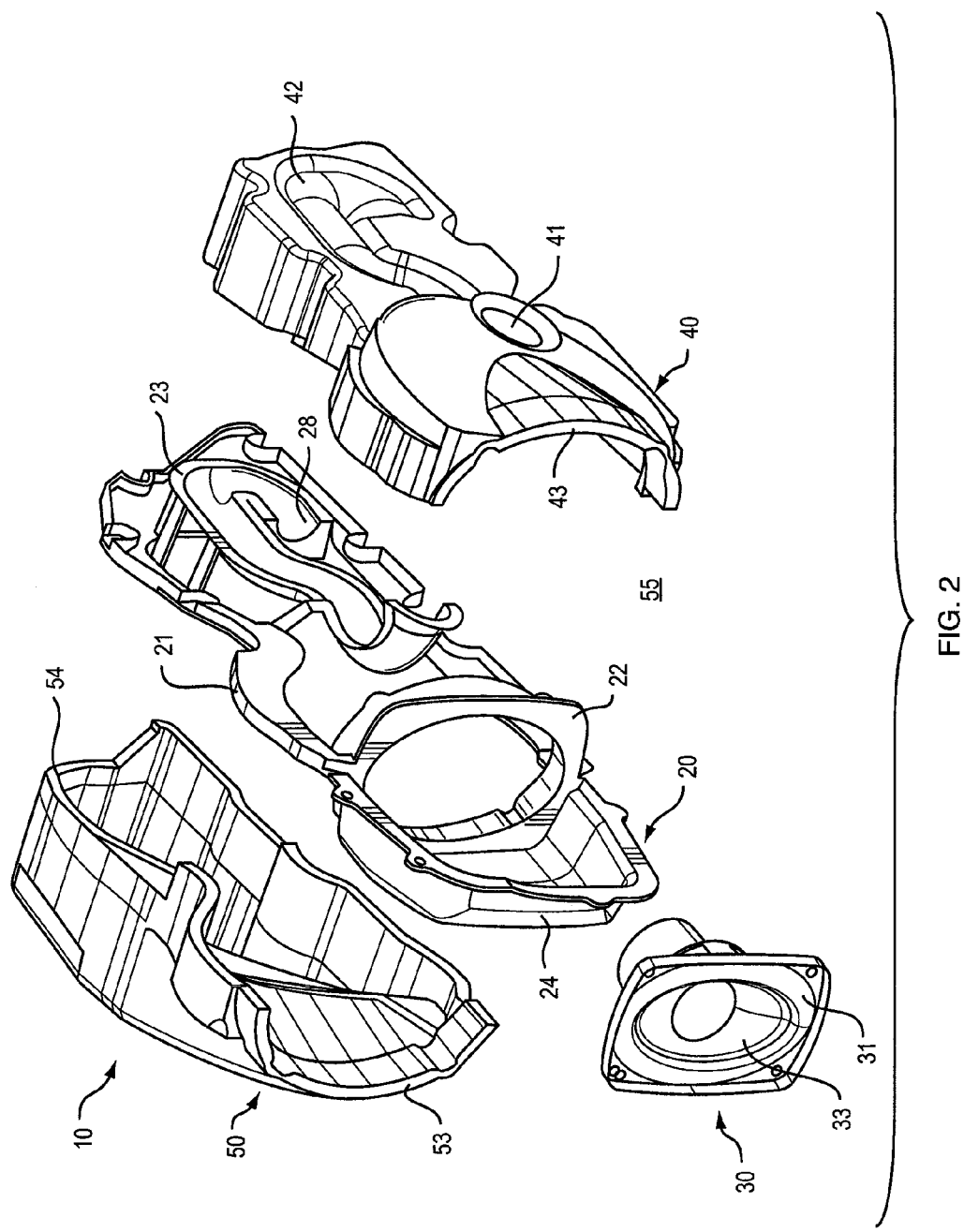
FIG. 2 is an exploded view of the electro-acoustic enclosure of FIG. 1.

The electro-acoustic transducer enclosure apparatus comprises at least two enclosure members that entirely define, or at least in part define, the exterior walls of the enclosure as well as the enclosure volume. At least one such enclosure member is made either partially or fully of foam. This substantially reduces the weight of the enclosure. The apparatus has a stiff frame. The foam can be coupled to the frame in any manner appropriate for the materials and constructional requirements of the enclosure, and known to those skilled in the field.

Electro-acoustic transducer enclosure apparatus 10 is shown in FIGS. 1 through 5. Electro-acoustic transducer 30 generates low frequency acoustic signals, preferably from about 40 to about 150 Hz, in response to an electrical signal, not shown, applied to transducer 30. Transducer 30 comprises a diaphragm with front radiating surface 33 that moves along axis 34, FIG. 3. Axis 34 is perpendicular to the plane of the page in FIG. 3.

Transducer 30 is mounted in frame 20. Frame 20 is relatively stiff such that it does not substantially flex in response to the movement of the transducer diaphragm; flexure could damp or otherwise alter the output. Also, frame 20 requires sufficient strength to properly mount the transducer. In an embodiment in which the speaker enclosure apparatus is mounted in a vehicle door panel, frame 20 also should exhibit sufficient stiffness to create a water-tight seal to the door panel.

In apparatus 10, transducer 30 is mounted such that its radiating axis 34 is generally parallel to or coincident with the plane P in which enclosure member mounting structure 21 lies. Such mounting of transducer 30 relative to the major plane defined by frame 20 is accomplished with transverse transducer mounting flange 22, which is an integral part of frame 20. The outer ring 31 of the frame of transducer 30 is mounted to flange 22. Flange 22 could alternatively be a separate structure that was itself coupled to frame 20, for example using fasteners or by welding. Mounting of the transducer such that its radiating axis is parallel to or coincident with plane P is not a requirement of the enclosure apparatus. The transducer could alternatively be mounted such that its radiating axis was transverse to or perpendicular to plane P.

Figure 3:
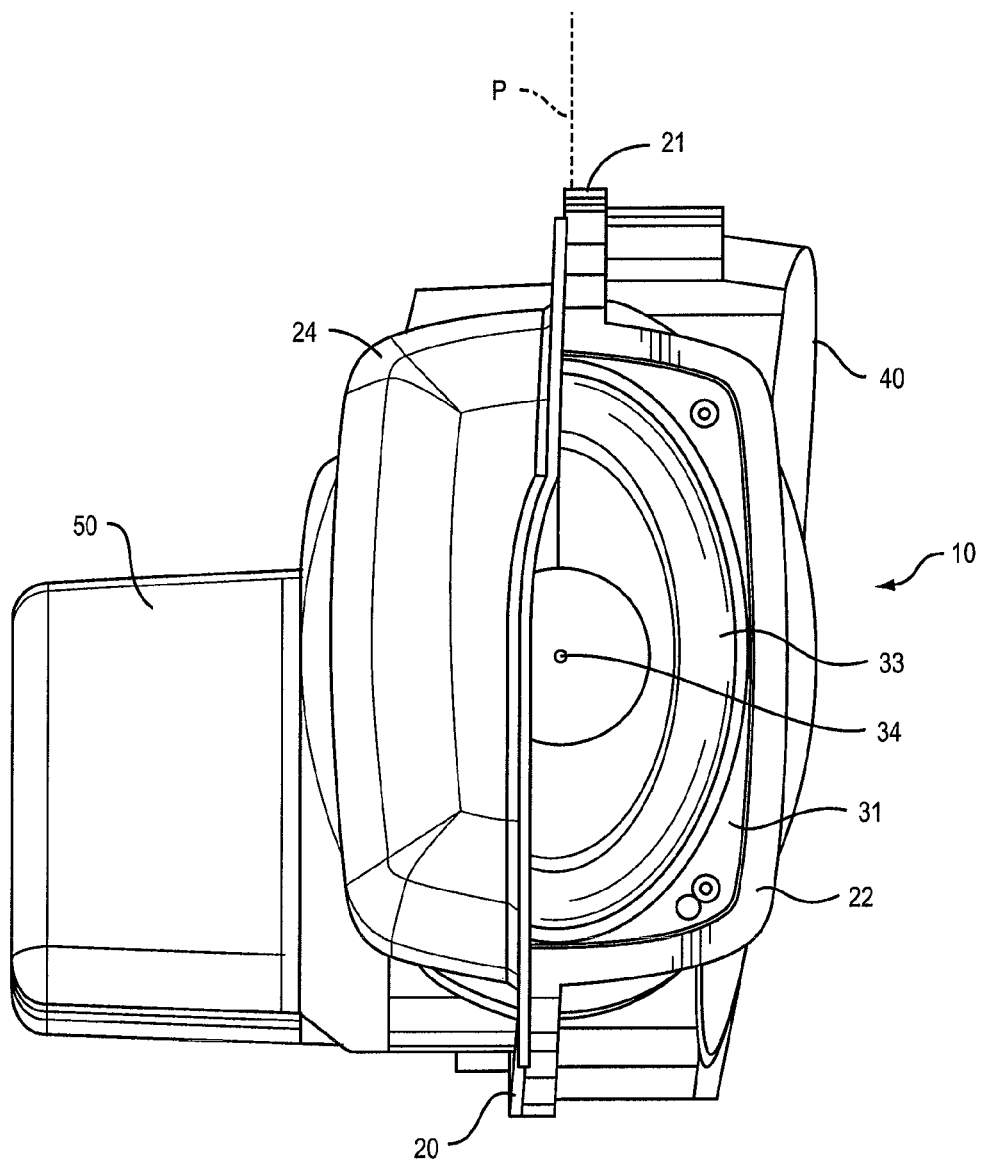
FIG. 3 is a front view of the electro-acoustic enclosure of FIG. 1.

One result of mounting the transducer such that its radiating axis is in or parallel to plane P is that the transducer diaphragm is typically located on both sides of plane P. The listening area is on one side of this plane (in the present embodiment, listening area 55 is on the side of plane P that includes the interior of the vehicle in which apparatus 10 is found). In order to direct sound into the listening area, sound diverter 24 is located in front of transducer front radiating surface 33. Diverter 24 is scoop shaped to direct sound into listening area 55. Diverter 24, in this example, is located entirely on one side of plane P as shown in FIG. 3. However, the diverter could be located in part on both sides of plane P as long as it is effective to direct sound emanating on the side of the plane away from the listening area back into the listening area. Diverter 24 in this embodiment is an integral part of frame 20 but could alternatively be a separate member that was coupled to enclosure member mounting structure 21.

Figure 4:
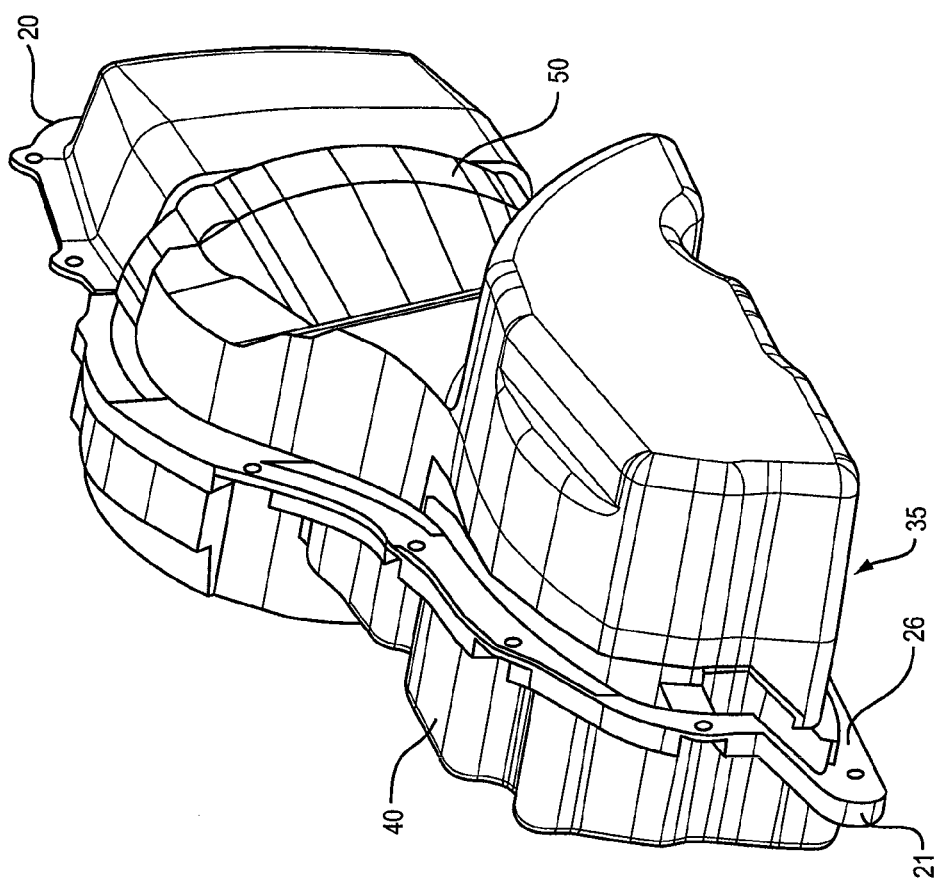
FIG. 4 is a rear perspective view of the electro-acoustic enclosure of FIG. 1.

Transducer enclosure 35 creates a fully or partially enclosed volume behind the transducer diaphragm. Enclosure 35 can be sealed to create a fully-enclosed volume, or can be partially open, for example by including a port; the port typically leads from the enclosure volume to the listening area. Enclosure 35 is made from at least two separate enclosure members. In the present embodiment, enclosure 35 is made entirely from two separate members: enclosure members 40 and 50. Enclosure members 40 and 50 are each directly coupled to frame 20. Enclosure members 40 and 50 thus essentially define the shape and volume of enclosure 35. Frame 20 functions as both an intermediate mounting surface for members 40 and 50 as well as the speaker enclosure structural member that carries all of the transducer-related stresses and enclosure mounting-related stresses of apparatus 10. Thin, elongated, generally planar, frame-shaped enclosure member mounting structure 21 of frame 20 defines opposed surfaces to which enclosure members 40 and 50 are directly mounted. One such surface 26 is indicated in FIG. 4. The surfaces are complementary to the inner peripheral faces of members 40 and 50, to allow members 40 and 50 to be coupled to frame 20 in a manner that is essentially air tight.

Members 40 and 50 create the necessary internal volume for the enclosure. Members 40 and 50 should be air tight and stiff enough to inhibit sound pressure loss. If the enclosure is used in a location that is not fully environmentally controlled, members 40 and 50 need to withstand the environment through such qualities as heat resistance and water resistance. Otherwise, members 40 and 50 contribute little to the structural requirements of enclosure 35.

In an embodiment, members 40 and 50 are made entirely of foam, and frame 20 is made entirely of a stiff plastic. Since foam can have a density that is substantially less than that of plastic, typically up to about 90% (or more) less, creating a transducer enclosure apparatus almost entirely of foam results in a substantial weight reduction as compared to an all plastic enclosure. In one non-limiting embodiment, members 40 and 50 are made entirely from GECET™ (a polyphenylene oxide/polystyrene copolymer with a density of no more than 7 pounds per cubic foot) available from Fagerdala USA-Mendota, Inc. of Mendota, Ill., USA, and have a wall thickness of no more than about 10 mm. In this embodiment, members 40 and 50 are essentially air tight up to about one bar internal pressure, resist shape change to at least about 100° C., exhibit a maximum use temperature of at least about 70° C., and possess a flexure strength of at least about 150 psi. In this embodiment frame 20 is made of glass-filled ABS (acrylonitrile butadiene styrene) with a density of no more than about 75 pounds per cubic foot, and has a thickness of no more than about 3 mm. In this embodiment, frame 20 resists shape change to at least about 100° C., exhibits a maximum use temperature of at least about 90° C., and possesses a flexure strength of at least about 15,000 psi.

The outer ring 31 of transducer 30 is mounted to transverse transducer mounting flange 22. Enclosure members 40 and 50 are coupled to the opposite flat faces of enclosure member mounting structure 21. Also, partially annular transducer mounting surfaces 43 and 53 of members 40 and 50, respectively, are directly coupled to the back face of transducer mounting flange 22. The coupling of members 40 and 50 to frame 20 can be accomplished in the manner that suits the materials which the two enclosure members and the frame are made. In the embodiment in which the enclosure members are made of foam and the frame is made of plastic, this direct coupling can be accomplished using an adhesive, or by contact welding the surfaces together. A more positive interlocking of the three members can be facilitated with a tongue and groove construction in addition to adhesive.

In an embodiment, enclosure member mounting structure 21 is an injection molded plastic frame that defines tongue structures (not shown) on at least a portion of the faces to which members 40 and 50 are mounted. The edges of members 40 and 50 that are directly coupled to the frame (e.g., edge 54 of member 50) have a complementary groove (not shown) that can be slid over or compressed and bent to fit over the tongue. Adhesive can be used to maintain an air tight bond. Alternatively, one of members 40 and 50 can be directly coupled to the frame, at least in part, by insert molding of the previously-created frame in the mold used to create the foam enclosure member.

The construction creates an air tight enclosure that also includes a port that is open to the listening area. In this non-limiting embodiment the port comprises tube 18 that is defined by partial tube wall 23 that is an integral portion of frame 20 and partial tube wall 42 that is an integral portion of member 40. When member 40 is coupled to frame 20, these two tube halves come together to create a tube having a first opening 28 located within the enclosure volume and a second opening 41 that is open to the listening area. The tube halves can be bonded together via adhesive or welding. When present, the port could be accomplished in other manners as is known in the field. For example, the tube could be could be a separate structure, or all of the tube could be a part of frame 20, or all of the tube could be a part of member 40.

One or both of the enclosure members are made at least partially of foam. The enclosure members are each coupled to a frame. Making both enclosure members entirely of foam can decrease the enclosure weight, as compared to an all plastic enclosure, by about 40%. Plastic or another structural material such as metal may comprise part of one or both of the enclosure members. This could be done to accomplish a particular structural functionality of the enclosure. For example, this could potentially allow the enclosure itself rather than the frame alone to fully or partially support the transducer enclosure apparatus on its mounting surface.

Figure 5:
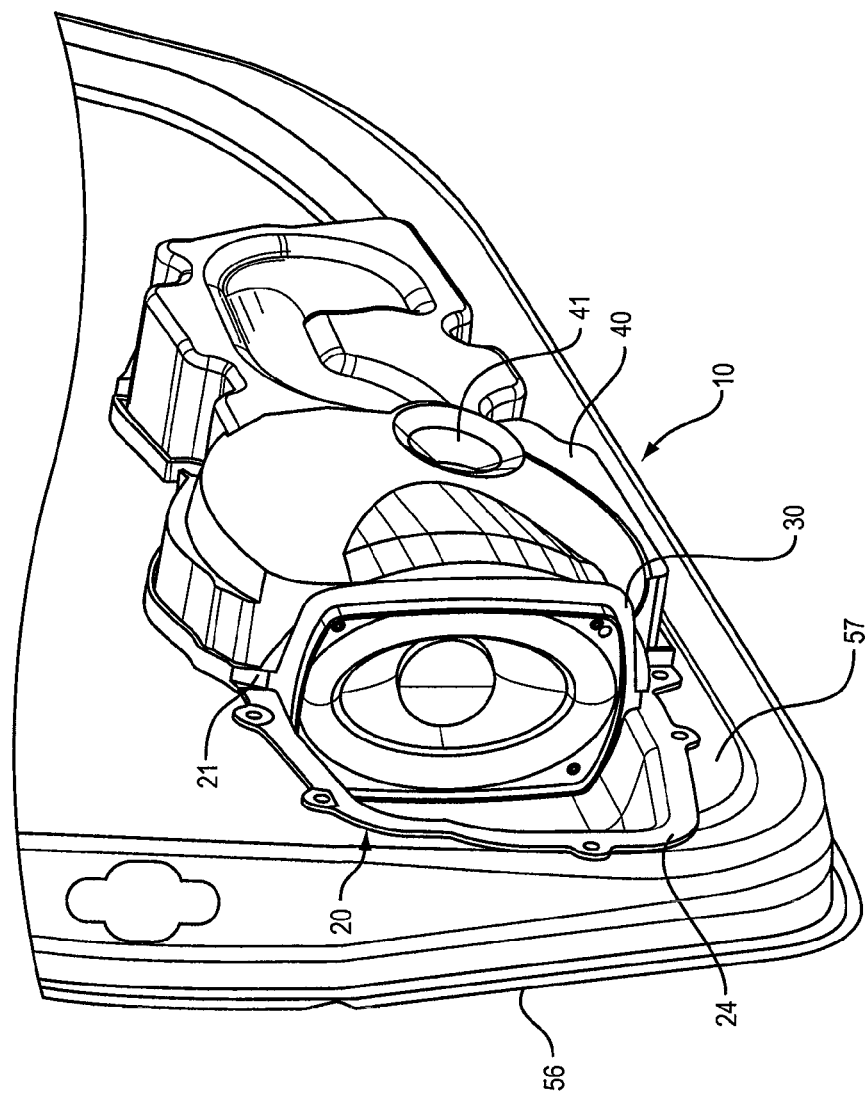
FIG. 5 is a front perspective view of the electro-acoustic enclosure of FIG. 1 mounted to a vehicle door frame.

In an embodiment, the electro-acoustic transducer enclosure is mounted to a baffle. Examples of baffles include vehicle door panels, vehicle rear package shelves, vehicle instrument panels, other surfaces of vehicles, a wall of a room, and a room ceiling, for example. FIG. 5 depicts transducer enclosure 10 located in a vehicle door, with frame 20 (specifically, structure 21 and diverter 24) mounted to door panel 57 of door 56. Frame 20 includes openings that accept fasteners such as screws that allow the frame to be mounted to door panel 57. This mounting accomplishes a water-tight seal that prevents water from leaking into the vehicle interior through the opening in panel 57 in which frame 20 is located.

The transverse mounting of transducer 30 generally aligns the transducer axis with the baffle; typically the axis is parallel to or coincident with the baffle although the axis could also be somewhat transverse to the plane of the baffle. Because frame 20 is stiff, forces generated by the moving transducer diaphragm cause little or no deflection of frame 20. Also, because such forces are mainly in the plane of the baffle, there is less vibration of the baffle created as opposed to a typical door mounted speaker that is mounted with its radiating axis perpendicular to the door panel, as described in co-pending application Ser. No. 11/591,285 filed Nov. 1, 2006, the disclosure of which is incorporated herein by reference. Diverter 24 directs essentially all of the sound into the vehicle interior. Port opening 41 is also located in the vehicle interior.

Figure 6:
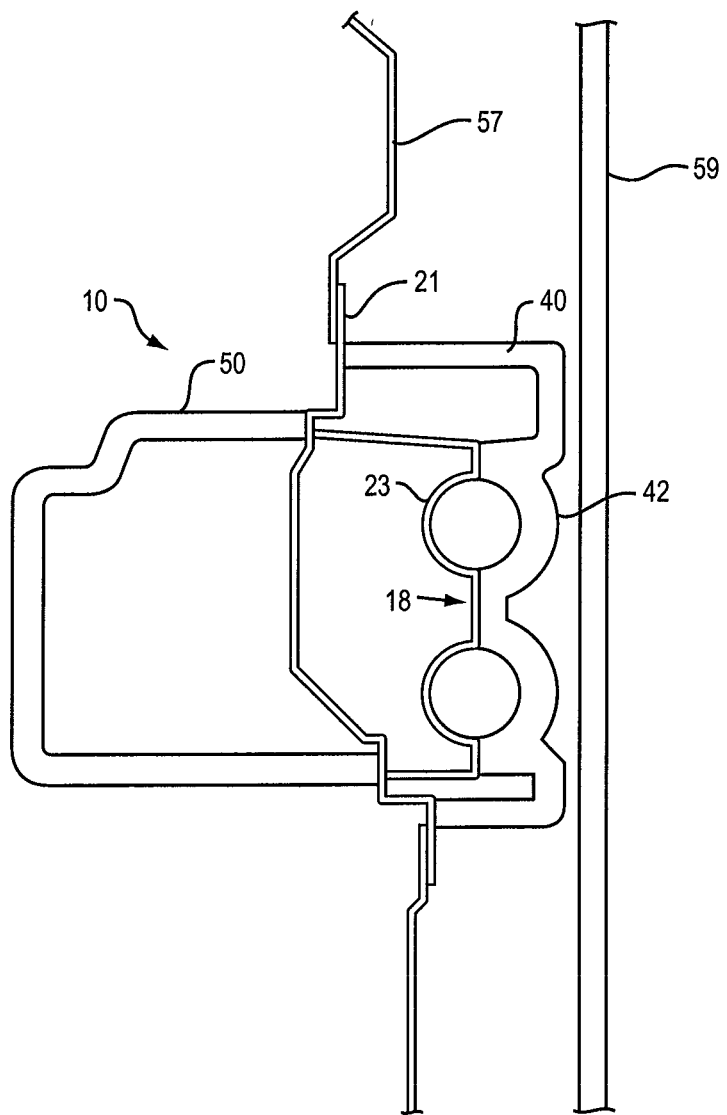
FIG. 6 is a cross-sectional view of the electro-acoustic enclosure of FIG. 1 mounted to a vehicle door frame.
Figure 7:
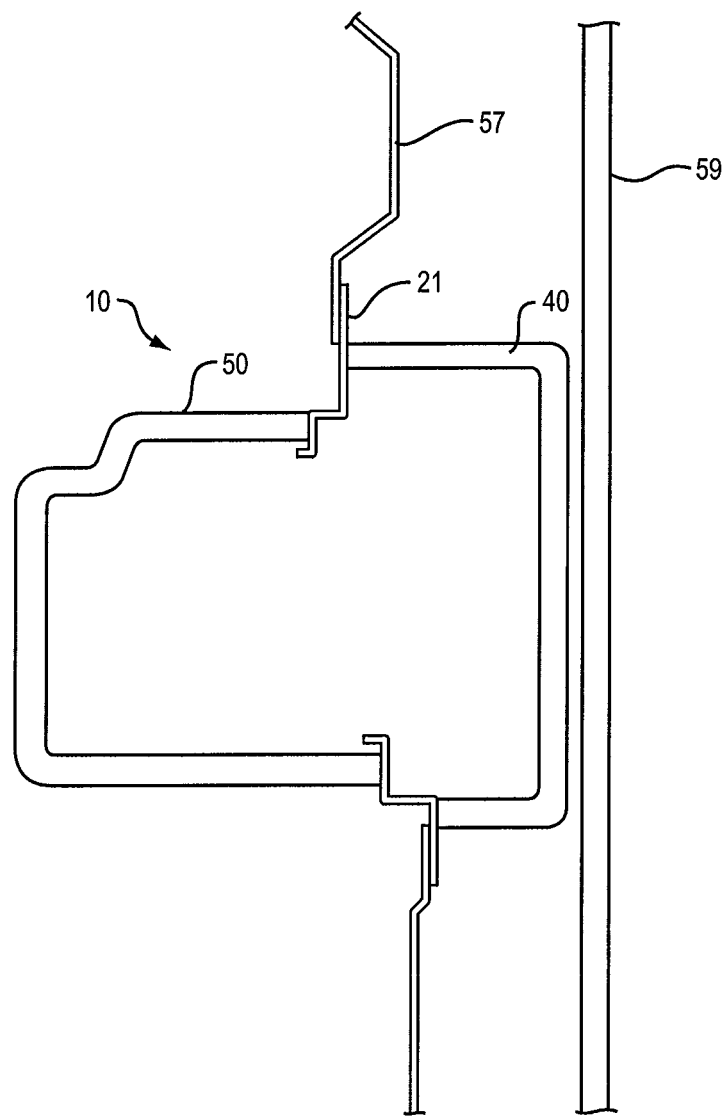
FIG. 7 is a second cross-sectional view of the electro-acoustic enclosure of FIG. 1 mounted to a vehicle door frame.
Figure 8:
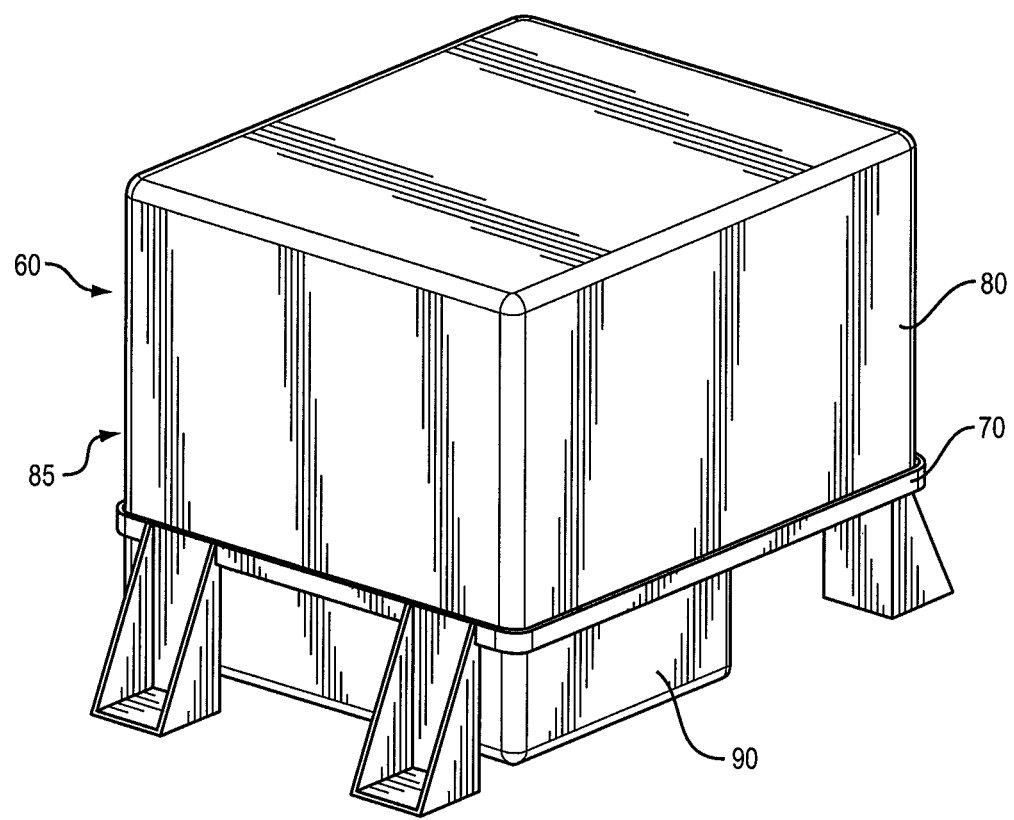
FIG. 8 is a perspective view of an electro-acoustic enclosure apparatus.
Figure 9:
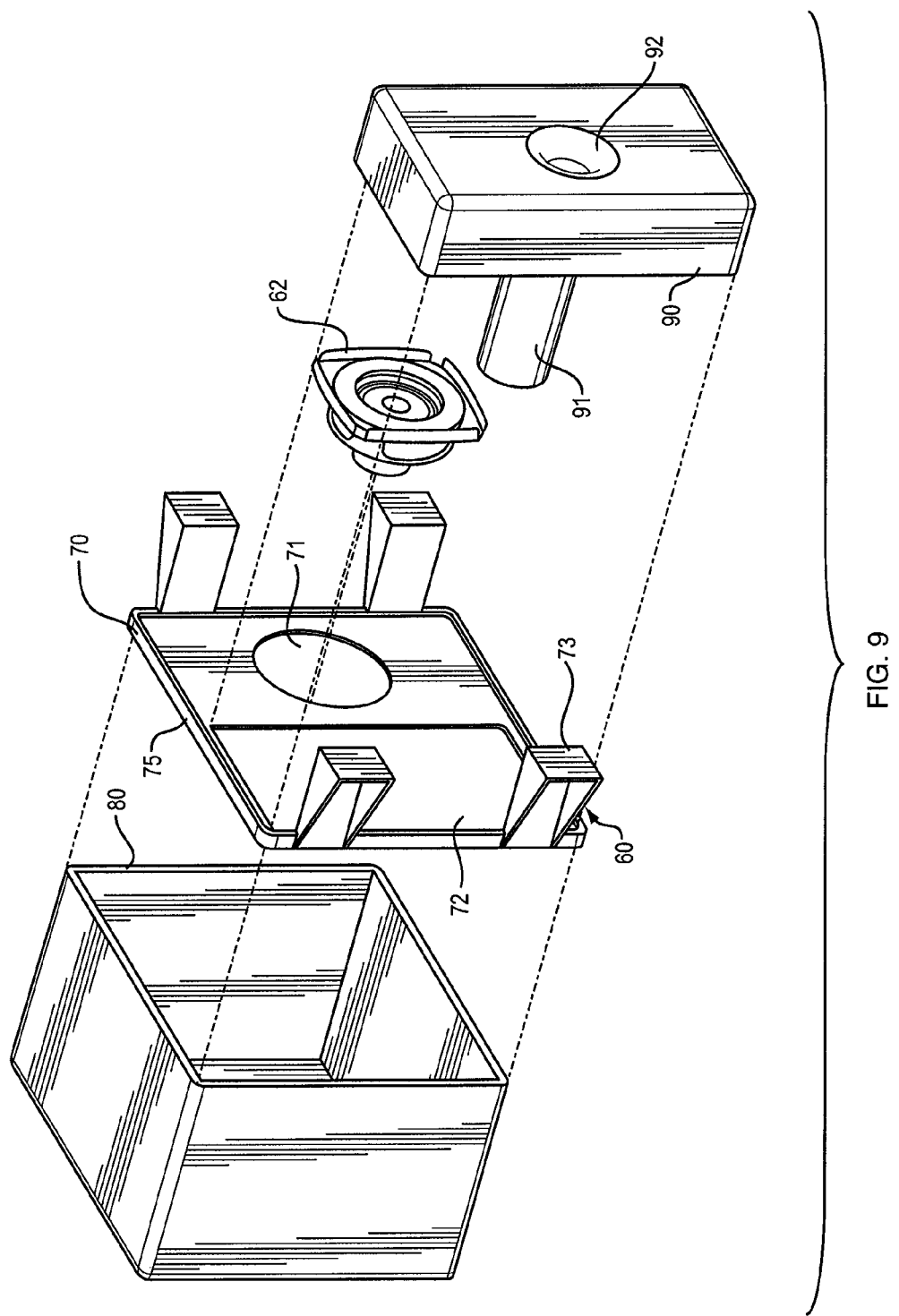
FIG. 9 is an exploded view of the electro-acoustic enclosure of FIG. 8.
Figure 10:
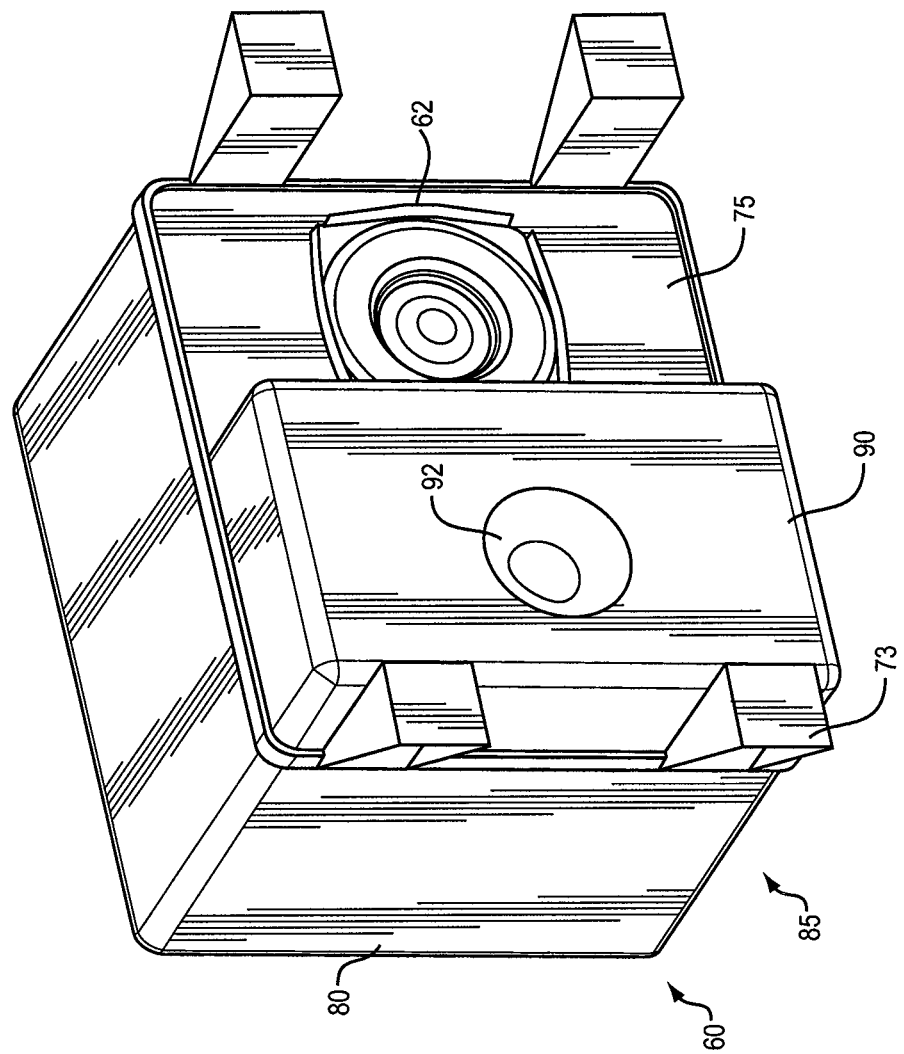
FIG. 10 is a bottom perspective view of the electro-acoustic enclosure of FIG. 8.
Figure 11:
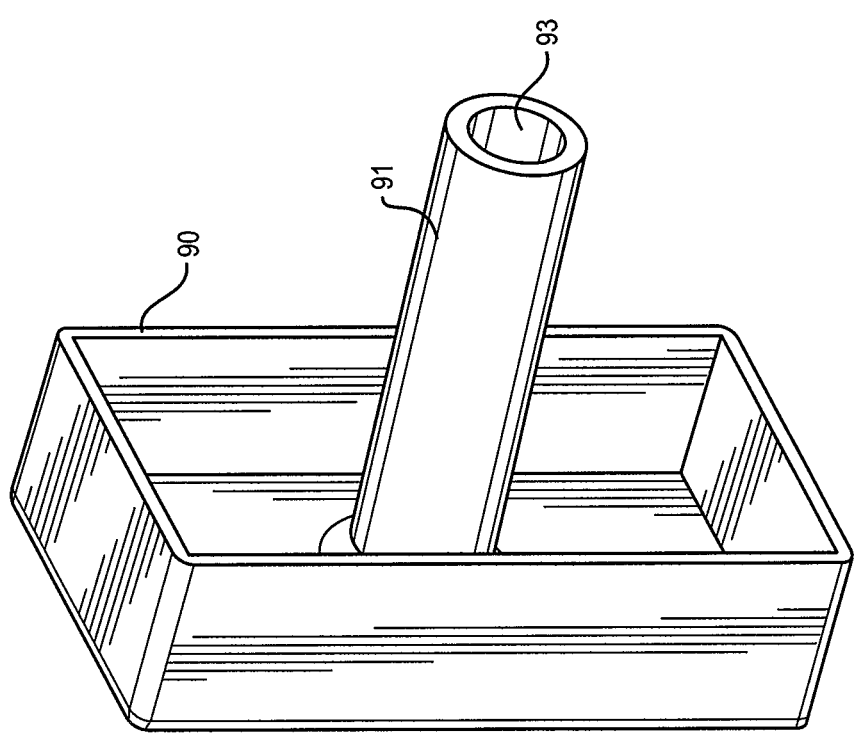
FIG. 11 is an interior perspective view of one of the enclosure members of the electro-acoustic enclosure of FIG. 8.

FIGS. 6 and 7 are cross-sections through apparatus 10 mounted to vehicle door panel 57. FIG. 6 is taken through the port tube 18 comprising partial tube walls 23 and 42. Mounting structure 21 is mounted to door panel 57 and carries enclosure members 40 and 50. Interior door panel trim 59 typically covers apparatus 10. FIG. 7 is a cross-section taken at a location at which tube 18 is not present.

FIGS. 8 through 11 depict electro-acoustic transducer enclosure apparatus 60 that comprises frame 70 and enclosure 85. Enclosure 85 comprises first enclosure member 80 and second enclosure member 90. Members 80 and 90 are mounted to generally planar enclosure mounting structure 75 of frame 70. One or both of members 80 and 90 comprise foam. In an embodiment, members 80 and 90 are made entirely of foam. The foam used is chosen based on performance and cost. For environments that do not require the high-temperature stability of vehicle interiors, a foam such as expanded polystyrene may be appropriate. Electro-acoustic transducer 62 is mounted in opening 71 in frame 70. Opening 72 acoustically couples the volume defined within first enclosure member 80 and the volume defined within second enclosure member 90. A port open to the listening area is accomplished with tube 91 coupled to enclosure member 90 and defining an opening 93 open to the interior of enclosure 85 and opening 92 open to the listening area. Frame 70 comprises generally planar enclosure mounting structure 75 and legs or standoffs 73. Preferably, frame 70 is a unitary injection molded plastic piece. Legs 73 allow apparatus 60 to be fixed to a surface or structure. In an example in which apparatus 60 is employed as a bass box for a motor vehicle, legs 73 allow the apparatus to be bolted to a structure of the automobile. One exemplary placement would be under the arm rest between bucket seats. Another exemplary placement would be in the vehicle spare tire well.

Figure 12:
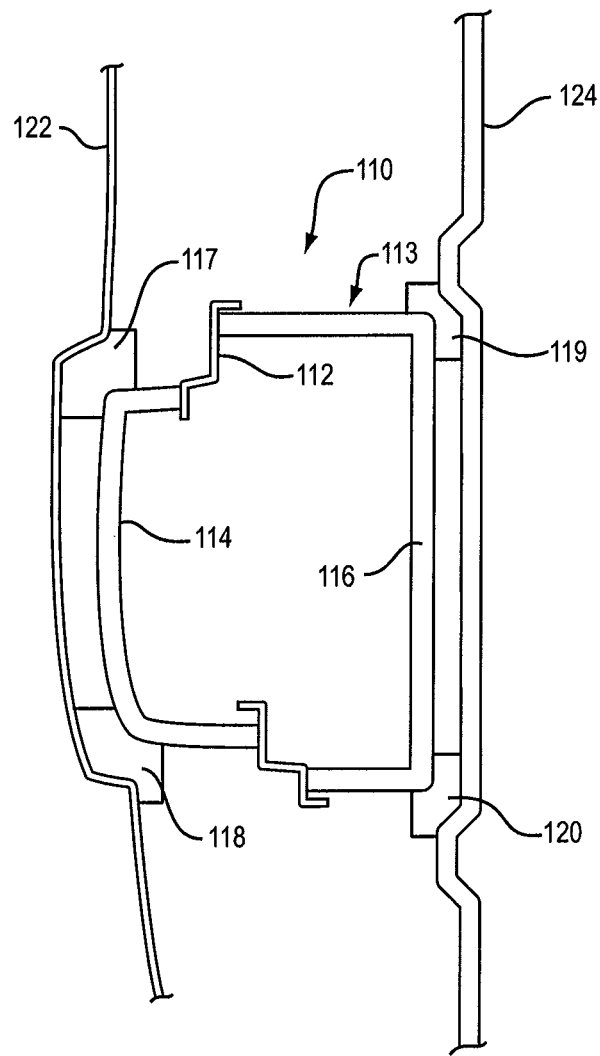
FIG. 12 is a cross-sectional view of an electro-acoustic enclosure apparatus mounted in a vehicle door.

FIG. 12 depicts electro-acoustic transducer enclosure apparatus 110 that comprises frame 112 and enclosure 113. Enclosure 113 comprises first enclosure member 114 and second enclosure member 116. Members 114 and 116 are mounted to generally planar opposing faces of frame 112. One or both of members 114 and 116 comprise foam. In an embodiment, members 114 and 116 are both made entirely of foam. Apparatus 110 is mounted to vehicle door panel 122 (which is typically made of sheet metal) and vehicle interior trim panel 124 (e.g., an interior door trim panel that is typically made of plastic) such that apparatus 110 floats between these two panels. Such mounting could be accomplished with an enclosure shape and size that allowed it to be wedged between panels 122 and 124. Foam mounting blocks 117-120 can optionally be used to facilitate mounting. Blocks 117-120 can be located between enclosure 113 and panels 122 and 124. Mounting blocks 117-120 cushion enclosure 113 from panels 122 and 124, and provide a simple means of interference-fit mounting of a standard-sized enclosure where there may be slight differences in the distance between panel 122 and panel 124 from vehicle to vehicle. In an embodiment, member 114 can conform to the shape of and be mounted directly to panel 122: this may provide additional strength to the enclosure while allowing thinner foam to be used for a foam enclosure member at that location.

Figure 13:
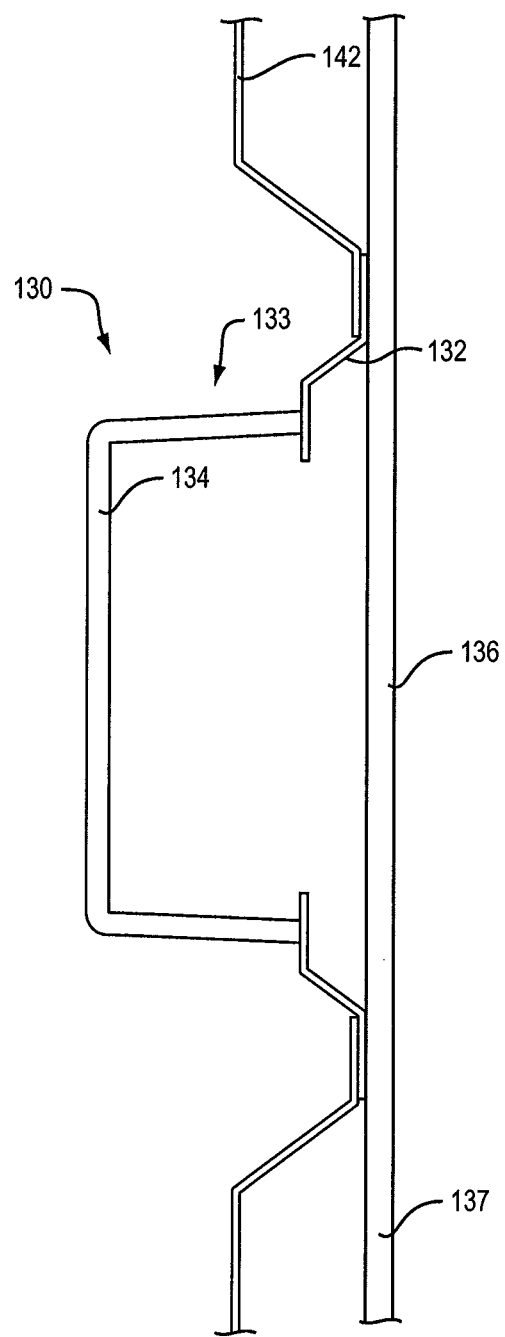
FIG. 13 is a cross-sectional view of an electro-acoustic enclosure apparatus mounted to a vehicle door.

FIG. 13 depicts electro-acoustic transducer enclosure apparatus 130 that comprises frame 132 and enclosure 133. Enclosure 133 comprises first enclosure member 134 and second enclosure member 136. Members 134 and 136 are mounted to generally planar faces of frame 132. Member 134 is made entirely of foam. Member 136 is a portion of vehicle interior trim panel 137 (e.g., an interior door trim panel), which is typically a molded plastic panel made from a material such as ABS. Thus, frame 132 is mounted to vehicle door panel 142 and is also mounted to interior trim panel 137. Apparatus 130 thus accomplishes a transducer enclosure that is mounted to the vehicle interior trim panel and has only one separate enclosure member in addition to the trim panel rather than two additional enclosure members as in the other embodiments.

A number of embodiments have been shown and described. Nevertheless, it will be understood that various modifications may be made without departing from the spirit and scope of the invention. Accordingly, other embodiments are within the scope of the claims.

What is claimed is:

1. An apparatus, comprising:
   an electro-acoustic transducer comprising a front radiating surface that moves along a transducer axis;
   an open frame that carries the transducer, wherein the frame lies generally in a frame plane and defines opposed first and second mounting surfaces, wherein the transducer axis is generally parallel to or coincident with the frame plane;
   an enclosure made from hollow first and second enclosure members, each enclosure member made at least in part of plastic foam;
   wherein the first enclosure member has an inner peripheral surface that is complementary to the first mounting surface of the frame;
   wherein the second enclosure member has an inner peripheral surface that is complementary to the second mounting surface of the frame;
   wherein the inner peripheral surface of the first enclosure member is coupled to the first mounting surface of the frame;
   wherein the inner peripheral surface of the second enclosure member is coupled to the second mounting surface of the frame; and
   wherein the first and second enclosure members define interior volumes that communicate through the open frame, to create an enclosure volume behind the transducer diaphragm.

2. The apparatus of claim 1 wherein the first and second enclosure members are made entirely of foam.

3. The apparatus of claim 2 wherein the enclosure is made entirely of the first and second enclosure members.

4. The apparatus of claim 1 further comprising an acoustic element that acoustically couples the enclosure volume to a listening area.

5. The apparatus of claim 4 wherein the acoustic element comprises a port.

6. The apparatus of claim 5 wherein the port is formed at least in part by an enclosure member.

7. The apparatus of claim 6 wherein the port comprises a tube defining a first length, the tube further defining a first open end inside the enclosure volume and a second open end that is open to the listening area.

8. The apparatus of claim 7 wherein the tube comprises a first partial tube wall formed in the frame and a second partial tube wall formed in an enclosure member, the first and second partial tube walls each defining the first length and coupled together along their lengths to form the tube.

9. The apparatus of claim 1 wherein the frame comprises a transducer mounting flange to which the transducer is mounted.

10. The apparatus of claim 9 wherein the transducer mounting flange has a mounting surface to which the transducer is mounted, where the transducer mounting surface is perpendicular to the frame plane.

11. The apparatus of claim 10 wherein the frame further comprises a diverter that extends in front of the front radiating surface of the transducer.

12. The apparatus of claim 11 wherein the diverter comprises a scoop that is located primarily or entirely on one side of the frame plane.

13. The apparatus of claim 1 wherein the frame is made of plastic.

14. The apparatus of claim 1 further comprising a baffle, wherein the frame is coupled to the baffle.

15. The apparatus of claim 14 wherein the baffle is selected from a group consisting of a vehicle door panel, a vehicle rear package shelf, a vehicle instrument panel, a room wall and a room ceiling.

16. The apparatus of claim 15 wherein the transducer axis is generally parallel to or coincident with the baffle.

17. The apparatus of claim 1 wherein the first enclosure member is made entirely of foam.

18. The apparatus of claim 17 wherein the second enclosure member comprises vehicle trim.

19. The apparatus of claim 18 wherein the apparatus is adapted to be mounted to a vehicle door panel.

20. The apparatus of claim 19 wherein the frame is mounted to the vehicle door panel, and the first and second enclosure members are mounted to the frame.

21. The apparatus of claim 1 wherein the apparatus is adapted to be mounted to a vehicle door panel and vehicle trim.

22. The apparatus of claim 21 wherein the vehicle door panel and vehicle trim are spaced from one another and the apparatus is located in this space.

23. The apparatus of claim 22 further comprising mounting structures located between the apparatus and the vehicle door panel and the vehicle trim.

24. The apparatus of claim 23 wherein the mounting structures comprise one or more first foam blocks located between the first enclosure member and the vehicle door panel and one or more second foam blocks located between the second enclosure member and the vehicle trim.

25. The apparatus of claim 22 wherein one enclosure member is mounted to the vehicle door panel.

26. A speaker enclosure, comprising:
   an electro-acoustic transducer comprising a front radiating surface that moves along a transducer axis;
   an open plastic frame supporting the transducer, wherein the frame comprises a transducer mounting flange to which the transducer is mounted;
   an enclosure made entirely of first and second hollow enclosure members each directly coupled to the frame to define an enclosure volume, the enclosure members each made entirely of foam; and
   a port that acoustically couples the enclosure volume to a listening area;

wherein the frame defines an enclosure member mounting structure to which the first and second enclosure members are directly coupled, the enclosure member mounting structure characterized by a frame plane, and wherein the transducer axis is generally parallel to or coincident with the frame plane.

27. A speaker enclosure adapted to be mounted to a vehicle door panel, comprising:

an electro-acoustic transducer comprising a front radiating surface that moves along a transducer axis;

an open plastic frame supporting the transducer and adapted to be mounted to the vehicle door panel, wherein the frame comprises a transducer mounting flange to which the transducer is mounted;

an enclosure made entirely of first and second hollow enclosure members each directly coupled to the frame to define an enclosure volume, the enclosure members each made entirely of foam; and a port that acoustically couples the enclosure volume to the interior of the vehicle;

wherein the frame defines an enclosure member mounting structure to which the first and second enclosure members are directly coupled, the enclosure member mounting structure characterized by a frame plane, and wherein the transducer axis is generally parallel to or coincident with the frame plane and the vehicle door panel.

* * * * *